(12) United States Patent
Bareis et al.

(10) Patent No.: US 7,753,383 B2
(45) Date of Patent: Jul. 13, 2010

(54) DEVICE FOR UNCOVERING AN OPENING IN A HOUSING PART OF A STEERING GEAR

(75) Inventors: Helmut Bareis, Eschach (DE); Martin Budaker, Heubach (DE); Reiner Kunz, Birkenlohe (DE); Wolfgang Reuter, Florstadt (DE); Oliver Hetzel, Waldstetten (DE); John Hasenclever, Aidlingen (DE)

(73) Assignee: ZF Lenksysteme GmbH, Schwaebisch Gmuend (DE)

( * ) Notice: Subject to any disclaimer, the term of this patent is extended or adjusted under 35 U.S.C. 154(b) by 42 days.

(21) Appl. No.: 12/083,296

(22) PCT Filed: Oct. 30, 2006

(86) PCT No.: PCT/EP2006/067903

§ 371 (c)(1),
(2), (4) Date: Jul. 7, 2008

(87) PCT Pub. No.: WO2007/093235

PCT Pub. Date: Aug. 23, 2007

(65) Prior Publication Data

US 2009/0133485 A1 May 28, 2009

(30) Foreign Application Priority Data

Feb. 14, 2006 (DE) .................. 10 2006 006 679

(51) Int. Cl.
*B62D 7/00* (2006.01)

(52) U.S. Cl. ............. 280/93.514; 280/93.515; 280/779; 74/606 R; 137/183

(58) Field of Classification Search ........... 74/606 R; 180/400, 428, 444; 280/93.514, 93.515, 280/771, 779; 137/78.3, 81.2, 177, 183
See application file for complete search history.

(56) References Cited

U.S. PATENT DOCUMENTS

| | | | |
|---|---|---|---|
| 3,606,446 A * | 9/1971 | Leslie | ............... 296/208 |
| 4,922,960 A | 5/1990 | Oelschlaegel | |
| 5,148,825 A * | 9/1992 | Gil et al. | ............... 137/78.3 |
| 6,435,300 B1 | 8/2002 | Stolzenburg et al. | |
| 2005/0167939 A1* | 8/2005 | Howard | ............... 280/89.11 |

FOREIGN PATENT DOCUMENTS

| | | |
|---|---|---|
| DE | 199 17 392 | 10/2000 |
| DE | 101 22 993 | 12/2002 |
| FR | 2 098 823 | 3/1972 |
| FR | 2 859 156 | 3/2005 |

* cited by examiner

*Primary Examiner*—Ruth Ilan
(74) *Attorney, Agent, or Firm*—Jordan and Hamburg LLP

(57) ABSTRACT

A device for exposing an opening in a housing part of a steering gear in a vehicle steering system has a closure element that closes the opening and a component that, when it comes into contact with a liquid, changes at least one of its properties such that, after the component cooperates with the closure element, the closure element exposes the opening.

21 Claims, 4 Drawing Sheets

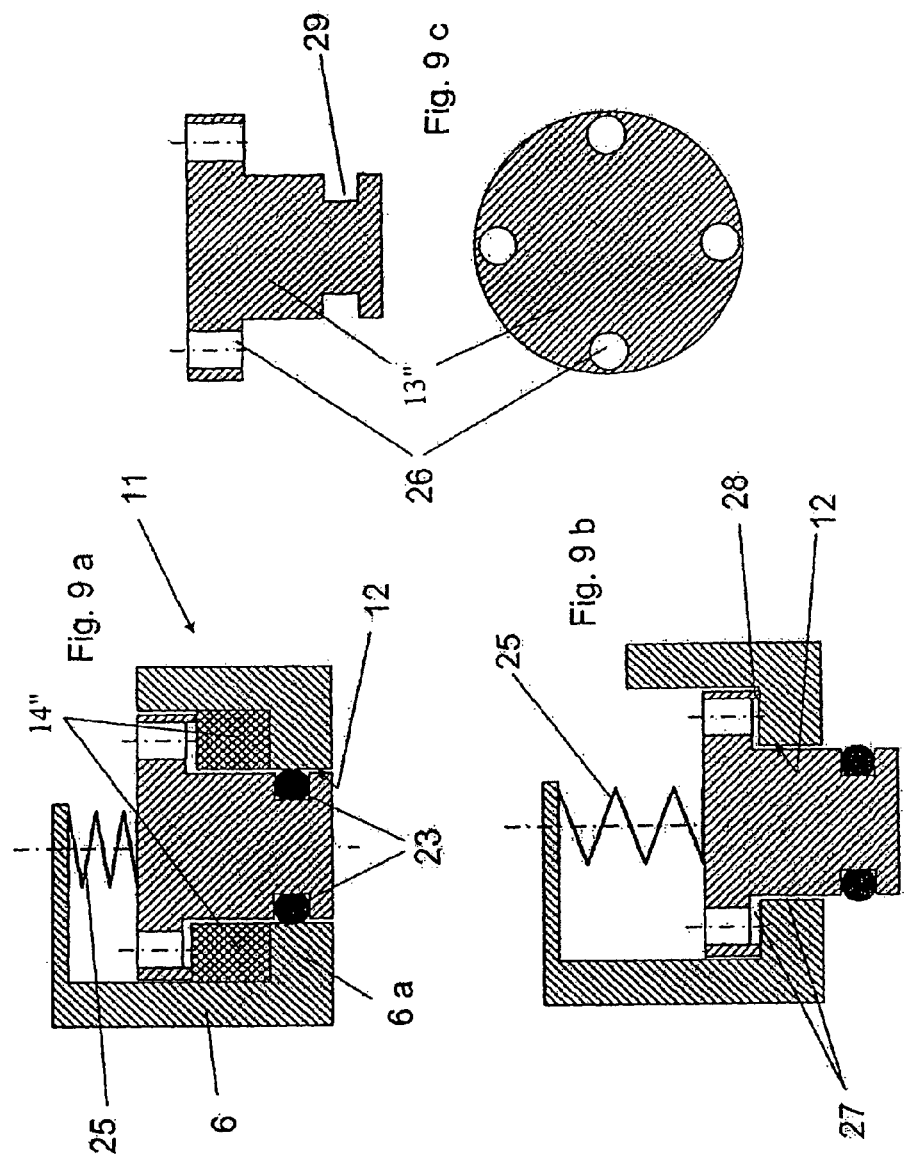

DEVICE FOR UNCOVERING AN OPENING IN A HOUSING PART OF A STEERING GEAR

BACKGROUND OF THE INVENTION

The invention relates to a device for exposing an opening in a housing part of a steering gear.

Steering systems for motor vehicles are generally sealed against the environment by bellows in the area where the rack is connected to the tie rod. One problem with these bellows, which generally comprise an elastomer material, is that they can be damaged for instance by animal bites, by the impact of stones, by tools, or by other factors. Although this risk can be reduced by employing high-quality materials, it cannot be eliminated altogether.

When the bellows are damaged, the entire steering system is no longer sealed and moisture can enter the steering gear. Since the location of the damage on the bellows is only very infrequently at the lowest point on the steering gear, the entering water does not drain off by itself and it collects inside the steering housing. However, water, in particular standing water, is damaging to the functional components of the steering gear and in some circumstances can lead to functional problems.

SUMMARY OF THE INVENTION

It is therefore the object of the present invention to create a device for exposing an opening in a housing part of a steering gear in a vehicle steering system, which device ensures the forced exposure of an opening in the steering gear, using the simplest means possible, when liquid has entered.

The inventive solution has a relatively simple design and the only additional component required is the component that changes its properties when it comes into contact with a liquid. Due to it, the closure element remains closed when no liquid penetrates into the housing of the steering gear, while liquid penetrating into the steering gear leads to very rapid opening of the closure element and thus to exposure of the opening. Because of this, the liquid in the steering gear can exit the steering gear via the now exposed opening and further damage is prevented.

In one very advantageous further development of the invention it can be provided that the component increases in volume when it comes into contact with a liquid. With such a component, in a further embodiment it can be provided that the component is arranged relative to the closure element such that when its volume increases it presses the closure element out of the opening. This is a particularly simple design in which the opening is permanently exposed.

Another solution with a component that changes its volume can provide that the component is arranged relative to the closure element such that when the volume increases it lifts the closure element inward from the opening against a spring element that is pressing the closure element into its closed position. The advantage of this solution is that when there is no more liquid in the housing the additional component dries out and the spring force ensures that the closure element re-seals the opening. In this manner liquid is prevented from penetrating into the steering gear via the opening in the steering housing.

One embodiment of the invention can be comprised in that the component comprises a material that, when it comes into contact with a liquid, reacts chemically such that the component destroys the closure element. In this case there are largely no mechanical processes, but rather exposure of the opening can be assured by the chemical reaction of the component with the liquid and by the subsequent reaction of the component changed by the liquid with the closure element.

Another embodiment of the invention can be comprised in that the component comprises a material that dissolves when it comes into contact with a liquid. The material of the component is advantageously selected such that only standing liquid initiates the dissolving process and the solid consistency of the component is retained at high humidity. The closure element is removed from the housing, and the opening is exposed, due to gravity or an additional spring element.

BRIEF DESCRIPTION OF THE DRAWINGS

Additional advantageous embodiments and further developments of the invention result from the other subordinate claims. The principles of exemplary embodiments of the invention are depicted in the following using the drawings.

FIG. 9 is an eighth embodiment of the inventive device.

DESCRIPTION OF THE PREFERRED EMBODIMENT

Figure 1:
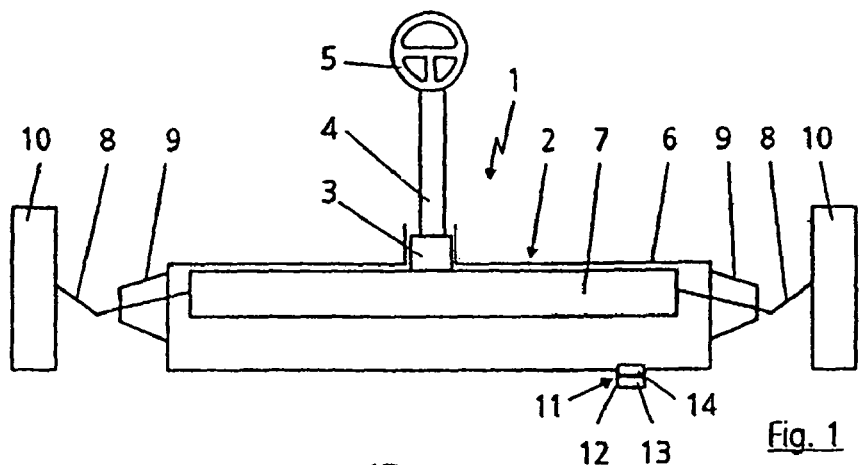
FIG. 1 is a very schematic depiction of a vehicle steering.

In all embodiments of the present invention, corresponding parts are designated by like reference numerals.

A vehicle steering system 1, depicted very schematically in FIG. 1, for a motor vehicle (not shown) has a steering gear 2, known per se, and disposed on its input side is a pinion 3, a steering column 4, and a steering handle 5. Disposed on the output side of the steering gear 2 in a housing part 6 thereof is a rack 7 that can be displaced in the longitudinal direction of the steering gear 2. The entire housing is considered the housing part 6, but also a single component of the housing, such as e.g. a housing cover or the like.

Each end of the rack 7 is connected to a tie rod 8. Each connecting area between the rack 7 and the respective tie rod 8 is enclosed by a bellows 9. A wheel 10 for the motor vehicle is attached to each tie rod 8 in a known manner.

Since a liquid, in particular water, can enter the steering gear 2 if one of the bellows 9 is damaged, a device 11 for exposing an opening 12 in the housing part 6 is arranged on the housing part 6. The opening 12 is closed with a closure element 13 so that in this area no liquid can penetrate into the steering gear 2 from outside. In all embodiments of the device 11, a component 14 is provided that, if it comes into contact with a liquid located in the steering gear 2, changes at least one of its properties such that after the component 14 cooperates with the closure element 13, the closure element 13 exposes the opening 12. Various embodiments of the device 11 are explained in the following using enlarged sectional depictions.

Figure 2:
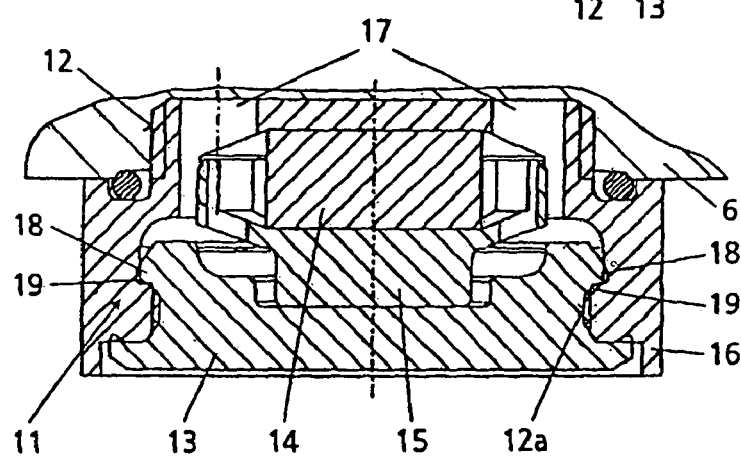
FIG. 2 is a first embodiment of the inventive device.

In the embodiment depicted in FIG. 2, the component 14, together with the closure element 13 and a piston 15 arranged between the component 14 and the closure element 13, is housed in a sleeve 16 that in this case is screwed into the opening 12 of the housing part 6 of the steering gear 2. As is the case for the other embodiments, as well, it is of course also possible to have another manner of connecting the sleeve 16 to the housing part 6. The sleeve 16 has openings 17 via which the liquid can travel to the component 14. The component 14, which can comprise for instance a hydrophilic chloroprene rubber, increases its volume when it comes into contact with the liquid, in particular water, such that it presses the closure element 13, in this case via the piston 15, out of an opening 12a that is in the sleeve 16 and that connects to the opening 12. The piston 15, which ensures controlled expansion of the component 14, can comprise plastic or metal, for instance.

When the device 11 is dry, in order to ensure closure of the opening 12a by the closure element 13, the latter has projections 18 that engage in corresponding undercuts 19 in the sleeve 16. In order to minimize the force that the component 14 must exert to remove the closure element 13 from the opening 12, the closure element 13 can comprise an elastomer, for instance.

In this embodiment, the closure element 13, the component, 14, and the piston 15 fall out of the opening 12a and opening 12a is not reclosed and thus the opening 12 is not reclosed. However, this is essentially not damaging because if one of the bellows 9 is damaged liquid can continue to travel into the steering gear 2 and in this manner it is assured that it drains out of the housing part 6. A new device 11 can be placed in the opening 12 during any future repair of the damaged bellows 9 in a workshop.

Figure 3:
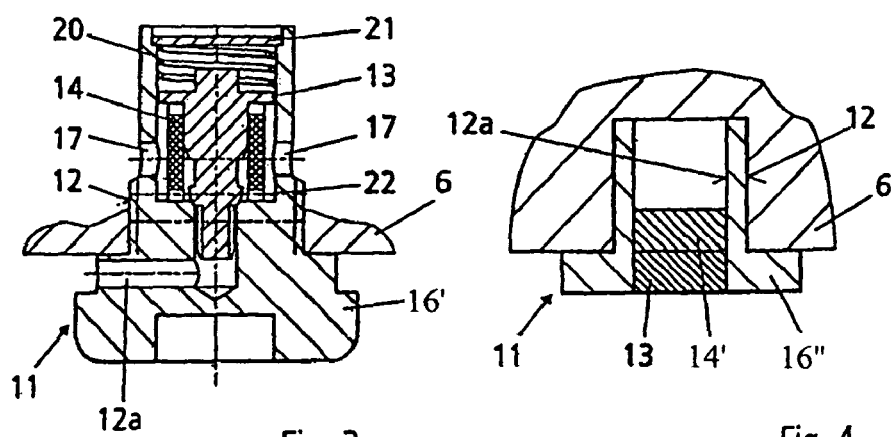
FIG. 3 is a second embodiment of the inventive device.

FIG. 3 depicts another embodiment of the device 11. In this case, a sleeve 16' is provided that screws into the opening 12 of the housing part 6 or is fastened in some other manner. Again the liquid located in the steering gear 2 can travel via the openings 17 to the component 14, which is again embodied such that it increases in volume when it comes into contact with a liquid. This embodiment of the component 14 can also comprise a hydrophilic chloroprene rubber. Such materials undergo an extreme change in volume when they come into contact with a liquid, especially water.

In the embodiment in accordance with FIG. 3, however, the closure element 13 is pressed into its closed position against the opening 12a in the sleeve 16' by means of a spring element 20, which in the present case is held in the sleeve 16' with a lock washer 21. As soon as the component comes into contact with the liquid it enlarges its volume and, against the force of the spring element 20, lifts the closure element 13 from the opening 12a and exposes it. To this end the component 14 has at its end facing away from the spring element 20 slits 22 that make it possible for the liquid to flow through the component 14 to the opening 12a. When the liquid has left the steering gear 2, the component 14 can dry out and the closure element 13 can re-close the opening 12a in the sleeve 16' and thus also the opening 12 in the housing part 6 using the force exerted by the spring element 20. The spring element 20 should be designed such that it is only strong enough that the component 14 when wet can reliably lift the closure element 13 against the force thereof from the opening 12a.

Figure 4:
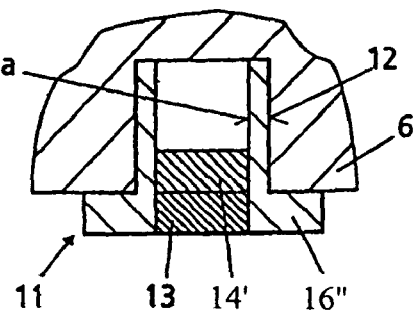
FIG. 4 is a third embodiment of the inventive device.

FIG. 4 depicts an embodiment of the device 11 in which the component 14 comprises a component 14' comprising a material that, when it comes into contact with a liquid, especially water, reacts chemically such that the component 14' destroys the closure element 13. In this case, as well, both the component 14' and the closure element 13 are arranged in a sleeve 16" attached to the housing 6 so that the device 11 can be exchanged in a simple manner after its use. Again in this case the opening 12a of the sleeve 16" is exposed by the component 14' due to the described destruction of the closure element 13.

Since the opening 12a is connected directly to the opening 12 in the housing part 6, exposure of the opening 12a can be considered exposure of the opening 12. Thus it is not the opening 12 in the housing part 6 that is directly exposed, but rather an opening 12a in the sleeve 16" that occurs at the location of the opening 12.

Figure 5:
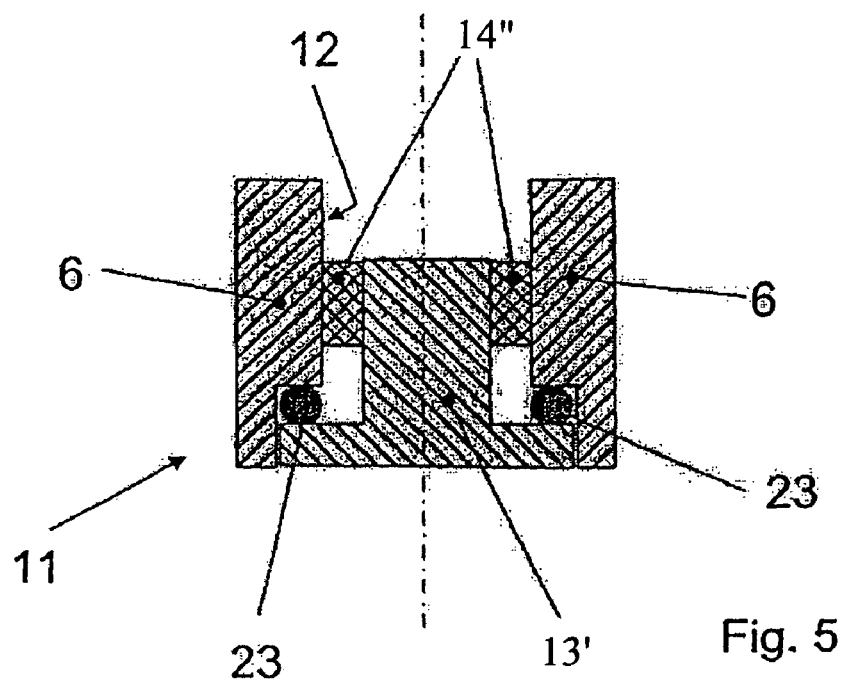
FIG. 5 is a fourth embodiment of the inventive device.

FIG. 5 depicts an embodiment of the device 11 in which the component 14 comprises a component 14" that comprises a material that dissolves when it comes into contact with a liquid, especially water, and exposes the opening 12 in the housing part 6 when the closure element 13, comprising a closure element 13', falls out due to the force of gravity.

Figure 6:
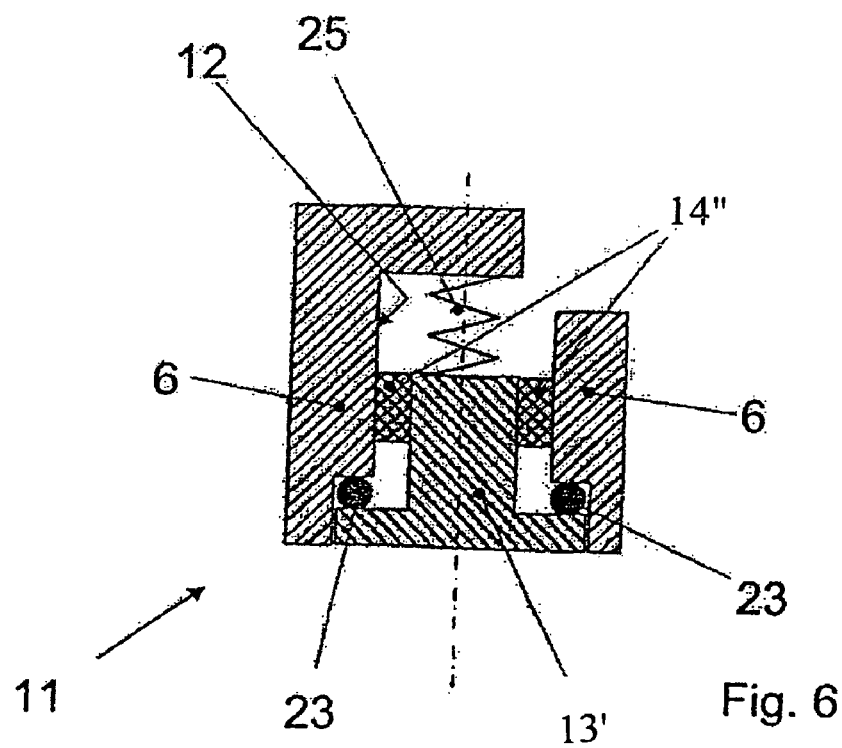
FIG. 6 is a fifth embodiment of the inventive device.

FIG. 6 depicts a refinement of the embodiment in accordance with FIG. 5 in which a spring element 25 integrated between closure element 13' and housing part 6 assists the closure element 13' in falling out due to the force of gravity with the advantage that the closure element 13' is pushed out even when the component 14" has not completely dissolved.

In both embodiments in accordance with FIGS. 5 and 6, prior to water entering, the component 14" is held in a form-fit in an annular gap between an outer surface of the closure element 13' and the inner surface of the opening 12 of the housing part 6. The annular gap does not have to be circular, but rather can also have an oval or other geometric shape.

In order to increase the holding force, the surfaces of the component 14" of the closure element 13' and the inner surface 12 of the housing part 6 have a very rough surface. Another option for enhancing the adhesion is to match the dimensions of the component 14", closure element 13', and inner surface 12 of the housing part 6 such that they are connected to one another under prestress.

Figure 7:
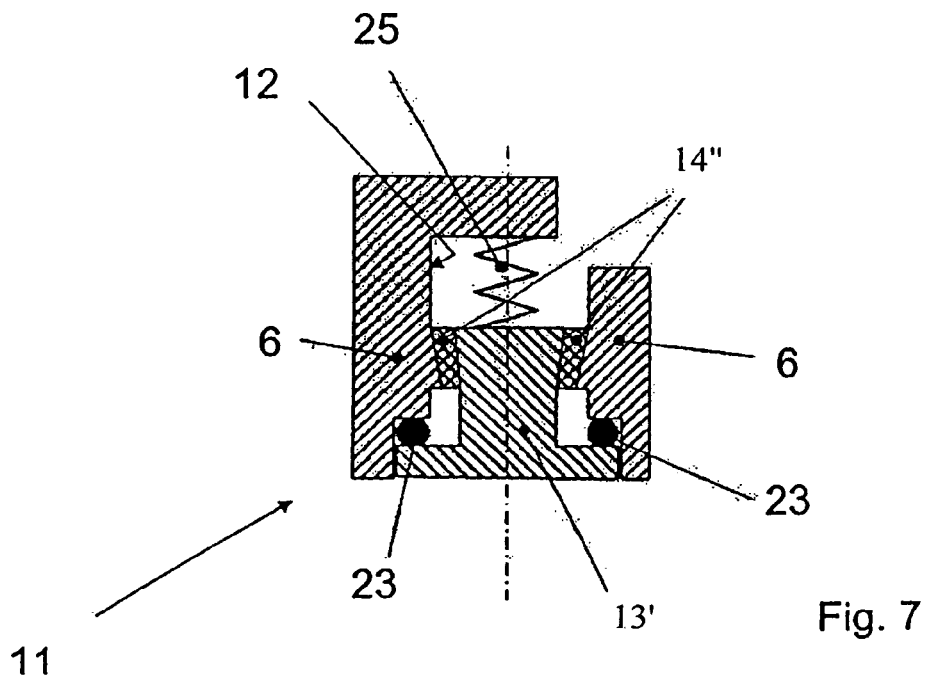
FIG. 7 is a sixth embodiment of the inventive device.

For materials of the component 14" that are not suitable for receiving the closure element 13' in the housing 6 with elevated friction or prestress, FIG. 7 depicts an embodiment of the device 11 in which the annular gap tapers toward the exterior of the housing. The closure element 13' is then wedged in the annular gap by the component 14" in the opening 12 of the housing part 6 until the component 14" dissolves when water enters the steering gear 2.

Figure 8:
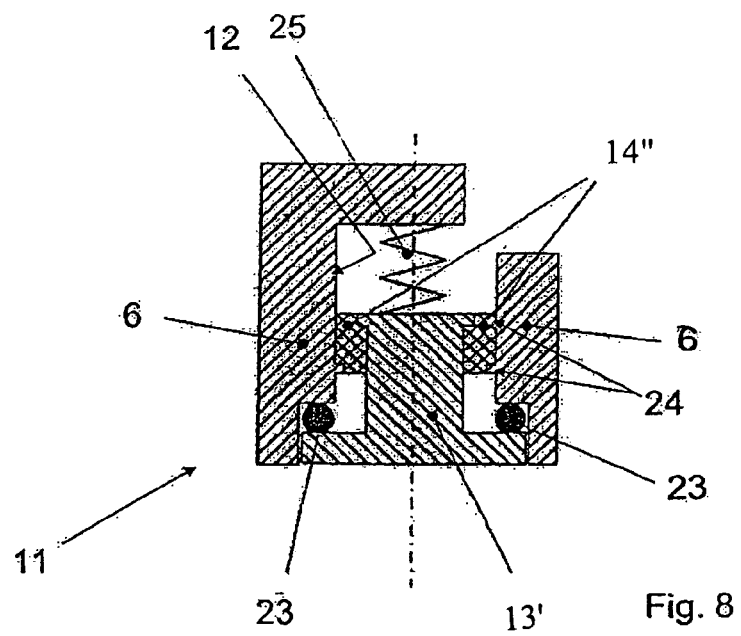
FIG. 8 is a seventh embodiment of the inventive device.

FIG. 8 depicts another embodiment for the functional interaction of closure element 13', component 14", and opening 12 of the housing part 6. In this device 11, until it dissolves, the component 14" that dissolves when water enters is held between closure element 13' in the opening 12 of the housing part 6 by a movement-inhibiting element 24. It is held as depicted, by the formation of a collar on the inner surface of the opening 12 of the housing part and/or the outer surface of the closure element 13'. However, other geometric embodiments (not shown) are also possible for a locking element for the device 11.

In order to protect the component 14" from water sprayed from the outside during normal operation of the steering gear, the closure element 13' of the embodiments in accordance with FIGS. 5 through 8 have a flange-like closure on the outside of the gear, such that a seal 23 can be arranged between the surface of this flange-like closure that faces the housing and a surface of the housing part 6 that corresponds thereto.

A solution in accordance with FIG. 9a-9c is particularly advantageous, since the closure element 13 can be re-used. In this solution, the closure element 13 comprises a closure element 13" in which the flange-like closure of the closure element 13" is arranged on the interior of the housing and has openings embodied as draining bores 26 in its flange part that projects over the core part of the closure element 13". As depicted in FIG. 9a, when the device 11 is closed the component 14", embodied annularly for instance, is arranged between the flange-like closure of the closure element 13" and a bottom segment 6a of the housing part 6. A seal 23 that is integrated in a receiving unit 29 of the core part of the closure element 13" seals the device 11 against sprayed water.

As already described in the other embodiments, the component 14" dissolves when water enters the steering gear. FIG. 9*b* depicts the device 11 after the component 14" has dissolved, and depicts a spring element 25 that is integrated between a housing part and the closure element 13" and that has pressed the closure element 13" downward against the adhesion force of the sealing element 23. Water that has penetrated can drain off via the draining bores 26 and the exposed drain channel 27. The drain channel 27 is formed on the one hand in the bottom segment 6*a* of the housing part 6 by an annular channel segment between the core part of the closure element 13" and the opening 12 and on the other hand in that the flange-like part of the closure element 13" is spaced from the bottom segment 6*a* of the housing part 6 by a spacer 28.

FIG. 9*c* depicts the closure element alone.

Of course it is also possible to integrate the device 11 in the embodiments in accordance with FIGS. 5 through 9, as described above, in a sleeve 16, 16' or 16".

In order to ensure the most complete possible drainage of liquid from the steering gear 2, in all of the embodiments the device 11 should be disposed at the lowest possible location in the steering gear 2.

The invention claimed is:

1. Device comprising a housing part of a steering gear in a vehicle steering system, said housing part having an opening, a closure element that closes said opening, a component that, when it comes into contact with a liquid, changes at least one of its properties such that after said component cooperates with said closure element, said closure element exposes said opening.

2. Device in accordance with claim 1, wherein said component increases its volume when it comes into contact with a liquid.

3. Device in accordance with claim 2, wherein said component is arranged relative to said closure element such that when its volume increases it presses said closure element out of said opening.

4. Device in accordance with claim 3, comprising a piston arranged between said component and said closure element.

5. Device in accordance with claim 2, wherein said closure element comprises an elastomer.

6. Device in accordance with claim 2, wherein said component is arranged relative to said closure element such that when the volume increases it lifts said closure element inward from said opening against a spring element that is pressing said closure element into its closed position.

7. Device in accordance with claim 1, wherein said component comprises a hydrophilic chloroprene rubber.

8. Device in accordance with claim 1, wherein said component comprises a material that, when it comes into contact with a liquid, reacts chemically such that said component destroys said closure element.

9. Device in accordance with claim 1, wherein said component comprises a material that, when it comes into contact with a liquid, reacts such that said component dissolves and loosens the locking of said closure element in said housing part and exposes said opening.

10. Device in accordance with claim 9, wherein said component is integrated in an intermediate space formed between said housing part and said closure element.

11. Device in accordance with claim 9, wherein said component is integrated in an annular gap formed between said housing part and said closure element such that said closure element is arranged in a form-fit in said housing part.

12. Device in accordance with claim 11, wherein mechanically connected surfaces of said component and/or of said closure element and/or of said housing part have a friction-enhancing surface roughness.

13. Device in accordance with claim 9, wherein said component is integrated prestressed in said annular gap formed between said housing part and said closure element.

14. Device in accordance with claim 9, wherein said annular gap formed between said housing part and said closure element tapers toward the exterior of the housing.

15. Device in accordance claim 9, wherein the closure element and/or housing part have at least one movement-inhibiting element.

16. Device in accordance with claim 9, wherein a prestressed spring element is integrated between the closure element and the housing part.

17. Device in accordance with claim 9, comprising a seal arranged between the housing part and the closure element.

18. Device in accordance with claim 9, comprising a draining device arranged in said closure element and/or in said housing part and/or between the closure element and the housing part.

19. Device in accordance with claim 1, wherein the device it is arranged largely at the lowest point of said steering gear.

20. Device in accordance with claim 1, wherein said component and said closure device are arranged in a sleeve that is connected to said housing part.

21. Device in accordance with claim 20, wherein said sleeve has an opening that connects to said opening in said housing part.

* * * * *